United States Patent Office 3,634,429
Patented Jan. 11, 1972

3,634,429
MORPHINAN DERIVATIVES AND
PREPARATION THEREOF
Willy Leimgruber, Montclair, and Ernest Mohacsi, Nutley, N.J., assignors to Hoffmann-La Roche Inc., Nutley, N.J.
No Drawing. Continuation-in-part of abandoned application Ser. No. 663,210, Aug. 25, 1967. This application Sept. 30, 1969, Ser. No. 862,536
Int. Cl. C07d 43/28
U.S. Cl. 260—285
14 Claims

ABSTRACT OF THE DISCLOSURE

There is described a process for the acid catalyzed cyclization of 1-(p-methoxybenzyl) - 1,2,3,4,5,6,7,8 - octahydroisoquinolines substituted in the 2-position with electron withdrawing groups to the corresponding morphinan compounds, by utilizing as the catalyst sulfuric acid, phosphoric acid, polyphosphoric acid or mixtures thereof. The morphinan compounds so produced are useful as intermediates in the preparation of 3-methoxy-N-methyl morphinans, known compounds with analgesic and antitussive properties.

RELATED APPLICATIONS

This application is a continuation-in-part of U.S. patent application Ser. No. 663,210, filed Aug. 25, 1967 by Willy Leimgruber and Ernest Mohacsi, now abandoned, the benefit of the filing date of which is hereby claimed.

BACKGROUND OF THE INVENTION 3-methoxy-N-methyl morphinans are produced, according to known methods, by processes which include an acid catalyzed cyclization step whereby 1-(p-methoxybenzyl)-2-alkyl-1,2,3,4,5,6,7,8-octahydroisoquinoline is cyclized to the corresponding morphinan. This cyclization can be best accomplished only by utilizing severe reaction conditions, e.g., a temperature of about 180° C. and a strong acid cyclization catalyst, which causes ether cleavage as a side reaction. In either case, the yields are relatively low and undesired by-products are formed. For example, 1-(p-methoxybenzyl) - 2 - methyl - 1,2,3,4,5,6,7,8 - octahydroisoquinoline is cyclized by treatment with a mixture of phosphoric acid and hydrochloric acid and requires temperatures of 100° C. for 120 hours, then temperatures of 170–180° C. for 20 hours to obtain a maximum yield of 67–69 percent of 3-hydroxy - N - methylmorphinan with 10-hydroxy - N - methylapomorphinan as the major by-product. For another example, 1-(p-methoxybenzyl)-N-methyl-10-hydroxydecahydroisoquinoline is cyclized by treatment with 48 percent hydrobromic acid at reflux for 6 hours to afford a yield of 30–40 percent of theory of 3-hydroxy-N-methylmorphinan as well as equal amounts of an isomer epimeric at $C_{14}$. The facts that the ether function is cleaved and that a number of by-products are formed indicate that the cyclization processes heretofore utilized are not entirely satisfactory or practical for commercial purposes.

SUMMARY OF THE INVENTION

This invention relates in one aspect to a process for forming morphinan compounds by the acid catalyzed cyclization of octahydroisoquinolines or decahydroisoquinolinols possessing electron withdrawing groups on the nitrogen atom. In another aspect, this invention relates to novel compounds, produced as a result of the process. More particularly in a preferred aspect, this invention relates to a process for forming morphinan compounds by the acid catalyzed cyclization of 1-(p-methoxybenzyl)-1,2,3,4,5,6,7,8-octahydroisoquinolines possessing electron withdrawing groups on the nitrogen atom, utilizing as the acid either sulfuric acid, phosphoric acid, polyphosphoric acid or mixtures thereof, e.g. sulfuric acid and phosphoric acid mixtures. This invention also relates to novel compounds formed by the invention process, particularly those in which the nitrogen atom is substituted with a formyl group.

DETAILED DESCRIPTION OF THE INVENTION

The process aspect of this invention is based on the discovery that octahydroisoquinolines or decahydroisoquinolinols containing electron withdrawing groups on the nitrogen atom can be cyclized with an acid cyclization catalyst, as defined hereinafter, to produce useful morphinan compounds in high yields and avoid the cleavage of the ether moiety present on the 1-p-methoxybenzyl group of the starting materials. The electron withdrawing groups on the nitrogen atom of the starting materials are groups which drastically reduce the basicity of the nitrogen atom. Typical of such groups are the formyl, acetyl, benzoyl, nitrile, nitro, nitroso and sulfonyl group. For use in this invention, it is preferred to use compounds containing as the electron withdrawing groups the formyl and acetyl groups with the formyl group being the preferred one. Compounds containing other electron withdrawing groups, however, are also suitable for use in the process of this invention. Representative compounds containing electron withdrawing groups which are suitable for use in this invention are those represented by the formulas

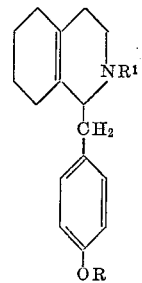

Ia

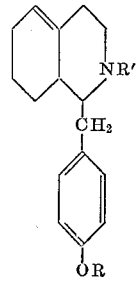

Ib

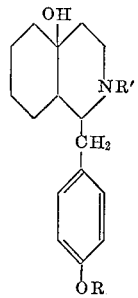

Ic

In each of the Formulas Ia, Ib and Ic, R is hydrogen, lower alkyl, lower alkanoyl, aroyl, R' is

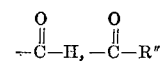

—CN, —NO₂, —NO, —SO₂R''''; R'' is lower alkyl, aryl, lower alkoxy, aryloxy, —NHR''' or NR₂''''; R''' is hydrogen, lower alkyl or aryl and R'''' is lower alkyl or aryl.

Preferred are compounds wherein R is hydrogen, lower alkyl, lower alkanoyl, aroyl and R' is

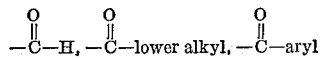

—SO₂-lower alkyl or —SO₂-aryl wherein aryl is a phenyl or tolyl moiety.

As used herein "lower alkyl" means straight or branched alkyl groups with from 1 to 8 carbon atoms, e.g., methyl, ethyl, propyl, isopropyl, butyl, tertiary butyl, pentyl, hexyl, septyl, octyl and the like; "aryl" means substituted or unsubstituted phenyl or naphthyl groups; "lower alkanoyl" means a lower alkanoyl group containing up to 6 carbon atoms e.g., acetyl; wherein "aroyl" means benzoyl or naphthoyl.

The compounds encompassed by Formulas Ia, Ib and Ic can be optically active compounds and either the racemates or the dextrorotatory or levorotatory antipodes are suitable for use in the process of this invention.

All the compounds encompassed by Formulas Ia, Ib and Ic are suitable for use in the process of this invention, however, because they are particularly effective in the process, i.e., higher yields at milder conditions, the compounds of Formulas Ia, Ib and Ic wherein R' is

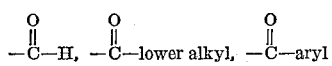

—SO₂-lower alkyl, or —SO₂-aryl, wherein aryl is a phenyl or naphthyl moiety, are preferred.

Among the preferred group of starting materials, those in which R' is formyl or acetyl are particularly advantageous since yields of up to about 90% can be obtained upon their cyclization. The formyl containing compound is most advantageous, and thus particularly preferred since the cyclization products containing this group can be more facilely converted to pharmaceutically active derivatives. For example, the formyl group can be removed by hydrolysis to form 3-methoxymorphinan in a considerably shorter time and in about twice the yields when compared to removal of the acetyl group by hydrolysis from the cyclization products containing the N-acetyl substituent.

The compounds encompassed by Formulas Ia, Ib and Ic are cyclized in yields which are higher than those wherein the nitrogen is substituted by, e.g., methyl, the compounds most often used in prior art processes for cyclization purposes.

The products which result from the process of this invention are intermediates useful for producing known compounds with pharmacological properties, e.g., dextromethorphan can be produced by removing the electron withdrawing group and methylating the nitrogen. The compounds which result from the cyclization process of this invention are represented by the following formula

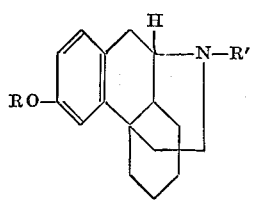

II wherein R and R' are the same as set forth under Formulas Ia, Ib and Ic.

Compounds represented by Formula II wherein R' is formyl are novel compounds and are particularly advantageous because of the facility of their conversion to pharmacologically active derivatives and are thus preferred compounds of this invention. The most preferred compound represented by Formula II is wherein R is lower alkyl, preferably methyl, and R' is formyl.

The compounds represented by Formula II may be optically active and all forms, i.e., racemic, D and L are produced by the process of this invention.

The process of this invention is illustrated by the following reaction scheme wherein the compounds of Formula Ia are used for convenience:

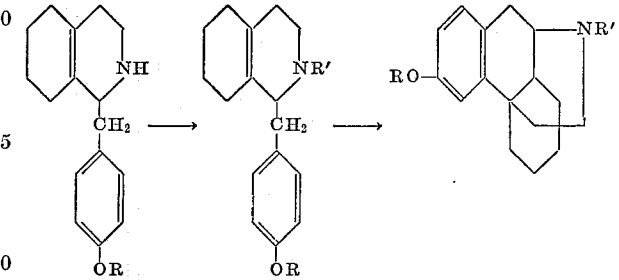

A specific illustration of this process is depicted in Scheme II wherein the synthesis of dextromethorphan is shown, utilizing as the starting material levorotatory 1-(p-methoxybenzyl) - 1,2,3,4,5,6,7,8 - octahydroisoquinoline.

Scheme II

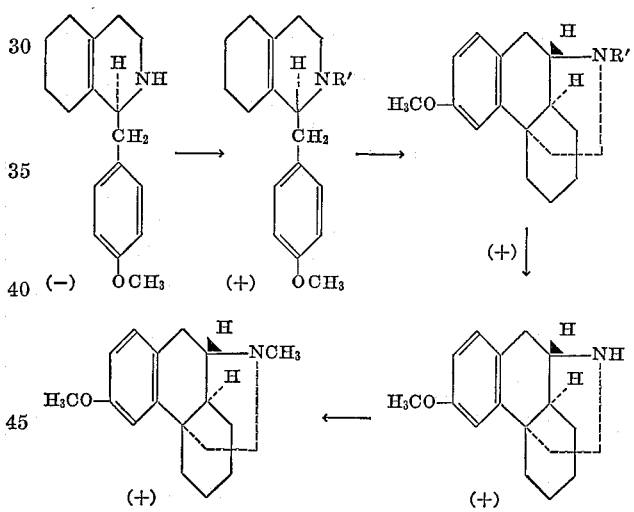

The essential process conditions which are utilized in the cyclization of compounds such as Ia, Ib and Ic are dependent upon the specific nature of the electron withdrawing group R', temperature, time and amount and identity of acid catalyst used.

Generally, the operable temperature range is from about 0° C. to about 160° C. The best results are obtained, however, at temperatures of from about 50° C. to about 100° C., when the acid catalysts as defined hereinafter are used. The reaction temperatures can vary depending upon the electron withdrawing group and the time of reaction desired. However, temperatures of from about 50° C. to about 100° C. are most suitable and thus preferred when using the preferred catalysts and starting materials.

The reaction times are variable and can be altered by a change in either the amount or identity of the acid catalyst, identity of electron withdrawing group and temperature. For example, using phosphoric acid as the catalyst at a temperature lower than room temperature can require as much as 24 hours to complete the reaction, while a sulfuric acid catalyst at room temperature requires, depending on the electron withdrawing group, only a few minutes, e.g., less than one hour, to complete the reaction. Higher reaction temperatures, e.g., 100°–160° C. reduce the reaction time accordingly. The amount of acid catalyst used is not critical since even minute amounts, i.e., less than a mole will effect a reaction. However, an increase in the amount of acid catalyst beyond one mole will reduce the reaction time to practical levels.

The acids which can be used to catalyze the cyclization are preferably sulfuric acid, phosphoric acid or polyphosphoric acid (PPA), either in mixtures or singly. These acids can be used in the presence of solvents but they need not be. The concentration of the acid used is not critical but for convenience generally commercially available concentrated acids are used.

The compounds of Formulas Ia, Ib and Ic are equivalent in this process since irrespective of which one is utilized as the starting material, the corresponding compound of Formula II is produced. The compounds of Formulas Ia, Ib or Ic and the acid catalyst are mixed together and the mixture is heated until the reaction is complete. The product is then recovered, usually by extraction, though the invention is not limited to this method of recovery.

The morphinan cyclization products can be treated to remove the electron withdrawing group, either by alkali hydroxide or acid in a suitable solvent such as methanol, to form a compound which is a secondary amine. The morphinan cyclization product which is preferred for such use is the N-formyl compound. The secondary amine can be subsequently alkylated, e.g., methylated, at the nitrogen by known means, e.g., formaldehyde and hydrogen over Raney nickel to form products with pharmaceutical utility, e.g., analgesic or antitussive.

In the event an optical antipode rather than the racemate is the desired end product, some of the intermediates or the final products can be resolved by means well known to the art, e.g., formation of a brucine salt. Advantageously, however, the required starting materials may be resolved at the outset into the D or L form depending upon the desired absolute configuration of the end product.

The method of producing the starting materials containing the electron withdrawing group varies with the particular group involved. For example, a formyl substituent can be attached to the nitrogen by reacting 1-(p-methoxybenzyl) - 1,2,3,4,5,6,7,8 - octahydroisoquinoline with methyl formate. The 1-(p-methoxy-benzyl)-1,2,3,4,5,6,7,8-octahydroisoquinoline can be acetylated with acetic anhydride in pyridine or ethoxycarbonylated with ethyl chloroformate or carbamoylated with urea or benzoylated with benzoyl chloride, all conventional reactions, using conditions well known in the art.

The racemates or optical antipodes of these compounds can be produced by the processes described hereinabove.

The following examples illustrating the invention are not intended to be limitative thereof. All temperatures are in ° C. Melting points were taken in capillaries with a Thomas Hoover melting point apparatus and are uncorrected. Boiling points are uncorrected.

EXAMPLE 1

Preparation of (±)-1-(p-methoxybenzyl)-2-formyl-1,2,3,4,5,6,7,8-octahydroisoquinoline A solution of 4 grams of (±)-1-(p-methoxybenzyl)-1,2,3,4,5,6,7,8-octahydroisoquinoline [O. Schnider and J. Hellerbach, Helv. 33, 1437 (1950)] in 20 ml. of freshly distilled methyl formate was refluxed for 76 hours. The excess methyl formate was then removed under reduced pressure. The residue was dissolved in ethyl acetate, the solution washed successively with 1 N hydrochloric acid and water, dried and the solvent removed under reduced pressure to give a 92% yield (4.1 g.) of crude (±)-1-(p-methoxybenzyl) - 2 - formyl - 1,2,3,4,5,6,7,8-octahydroisoquinoline. A sample of this material was distilled (B.P. 190–220°/0.25 mm.) and crystallized from ether, M.P. 59–61°.

EXAMPLE 2

Conversion of (±) - 1 - (p-methoxybenzyl)-2-formyl-1,2,3,4,5,6,7,8 - octahydroisoquinoline to (±) - 3-methoxy-N-methylmorphinan (a) 11.5 grams (±) - (p-methoxybenzyl) - 2-formyl - 1,2,3,4,5,6,7,8 - octahydroisoquinoline was added with stirring to 80 grams of 99.3% phosphoric acid and the resulting mixture was heated at 70° for 24 hours under nitrogen. The reaction mixture was cooled in an ice bath, diluted with ice-water and neutralized with conc. ammonium hydroxide. The aqueous suspension was extracted with a mixture of butanol-benzene (1:1, v./v.; 2× 500 ml.), and the combined organic layers were washed with water, dried and filtered. Concentration of the filtrate gave 12.1 g. of crude (±)-3-methoxy-N-formylmorphinan.

(b) 3.4 grams of crude (±)-3-methoxy-N-formylmorphinan in 25 ml. anhydrous tetrahydrofuran was added to a suspension of 0.444 gram of lithium aluminum hydride in 25 ml. anhydrous tetrahydrofuran and the mixture refluxed for 2 hours. The reaction mixture was cooled to room temperature and then ethyl acetate followed by water was added dropwise. The suspension was dried, filtered and the filtrate concentrated under reduced pressure. The residue was distilled (B.P. 140–147°/0.025 mm.) and crystallized from pentane to give 2.3 grams of (±)-3-methoxy-N-methylmorphinan, M.P. 82–84°.

EXAMPLE 3

Conversion of (±) - 1 - (p-methoxybenzyl)-2-formyl-1,2,3,4,5,6,7,8 - octahydroisoquinoline to (±) - 3-methoxymorphinan (a) A mixture of 11.1 grams (±)-1-(p-methoxybenzyl) - 2 - formyl - 1,2,3,4,5,6,7,8 - octahydroisoquinoline and 77 grams polyphosphoric acid was stirred at 60° for 18 hours under nitrogen. The reaction mixture was cooled, decomposed with ice-water, neutralized with conc. ammonium hydroxide and extracted with benzenebutanol (1:1, v./v., 2× 500 ml.). The organic solution was washed with water, dried and evaporated to give 10.9 g. (98% yield) of crude (±)-3-methoxy-N-formylmorphinan.

(b) 10.7 grams of crude (±)-3-methoxy-N-formylmorphinan was dissolved in 210 ml. of methanol and 110 ml. of 2.5 N aqueous sodium hydroxide were added. After this mixture had been heated under reflux for 16 hours, the methanol was removed under reduced pressure and the resulting aqueous suspension extracted with chloroform (3× 150 ml.). Removal of the solvent in vacuo gave 9.26 g. (96% yield) of crude (±)-3-methoxymorphinan. The product was distilled and had a B.P. 140–145°/0.05 mm.

EXAMPLE 4

Conversion of (±)-3-methoxymorphinan to (±)-3-methoxy-N-methylmorphinan 9.26 grams (±)-3-methoxymorphinan was dissolved in 350 ml. of methanol and added to 7 ml. of aqueous formaldehyde (37%). After addition of 7 g. of Raney nickel and 150 ml. of methanol, the mixture was hydrogenated at room temperature for 8 hours. The catalyst was removed by filtration, washed with methanol and the solvent evaporated in vacuo. Crystallization from petroleum ether gave 6.27 g. (65% yield) of (±) - 3-methoxy-N-methylmorphinan, M.P. 81–83°.

EXAMPLE 5

Preparation of (+)-1-(p-methoxybenzyl)-2-formyl-1,2,3,4,5,6,7,8-octahydroisoquinoline A solution of 73.0 grams (−)-1-(p-methoxybenzyl)-1,2,3,4,5,6,7,8-octahydroisoquinoline [A. Brossi and O. Schnider, Helv. 39, 1376 (1956)] in 275 ml. of freshly distilled methyl formate was heated at 50–65° for 24 hours in a glass liner under nitrogen (270 p.s.i.). The excess methyl formate was then removed under reduced pressure to give 78.8 g. (97% yield) of crude (+)-1-(p-methoxybenzyl) - 2 - formyl - 1,2,3,4,5,6,7,8-octahydroisoquinoline. A sample of this material was distilled, B.P. 190–220°/0.05 mm. $[\alpha]_D^{25}+23.4°$ (c. 1, MeOH).

EXAMPLE 6

Cyclization of (+)-1-(p-methoxybenzyl)-2-formyl-2-formyl-1,2,3,4,5,6,7,8-octahydroisoquinoline 78.8 grams (+) - 1 - (p-methoxybenzyl)-2-formyl-1,2,3,4,5,6,7,8 - octahydroisoquinoline was added with stirring to a mixture of 600 grams phosphoric acid and 12 grams conc. sulfuric acid and the resulting mixture was then heated at 70° for 20 hours under nitrogen. The reaction mixture was cooled in an ice bath, diluted with 1.5 l. of ice water, and extracted with a mixture of butanol-benzene (1:1, v./v.; 2× 2 l.). The combined organic layers were washed with water (500 ml.), dried over magnesium sulfate and filtered. Concentration of the filtrate gave 78.5 g. (99% yield) of crude (+)-3-methoxy-N-formylmorphinan. A distilled sample of this material (B.P. 206–210°/0.25 mm.) solidified in crystalline form, M.P. 106–109°, $[\alpha]_D^{25}+182.0°$ (c. 1, MeOH).

EXAMPLE 7

Preparation of (±)-1-(p-methoxybenzyl)-2-acetyl-1,2,3,4,5,6,7,8-octahydroisoquinoline 120 ml. acetic anhydride was added dropwise to a solution of 30 grams (±)-1-(p-methoxybenzyl)-1,2,3,4,5,6,7,8-octahydroisoquinoline in 300 ml. pyridine. The reaction mixture was stirred overnight at room temperature under nitrogen, and then evaporated under reduced pressure. The residue was dissolved in 500 ml. chloroform (500 ml.), and the solution was washed successively with 1 N hydrochloric acid (2× 250 ml.) and 2% aqueous sodium carbonate, dried and evaporated. Recrystallization of the residue from n-hexane yielded 26.6 g. (76% yield) of (±)-1-(p-methoxybenzyl)-2-acetyl-1,2,3,4,5,6,7,8-octahydroisoquinoline, M.P. 102–103°.

EXAMPLE 8

Cyclization of (±)-1-(p-methoxybenzyl)-2-acetyl-1,2,3,4,5,6,7,8-octahydroisoquinoline A mixture of 6.0 grams (±)-1-(p-methoxybenzyl)-2-acetyl - 1,2,3,4,5,6,7,8 - octahydroisoquinoline and 42 grams polyphosphoric acid was stirred at 80° for 18 hours under nitrogen. The reaction mixture was diluted with ice water, made alkaline with conc. ammonium hydroxide and extracted with butanol-benzene (1:1 v./v., 2× 200 ml.). The organic layers were evaporated under reduced pressure to give 5.5 g. (91% yield of crude (±)-3-methoxy-N-acetylmorphinan which solidified in crystalline form and had M.P. 137–139°.

EXAMPLE 9

Reduction of (±)-3-methoxy-N-acetylmorphinan

To a suspension of 100 mg. lithium aluminum hydride in 10 ml. anhydrous tetrahydrofuran, 800 mg. of crude (±)-3-methoxy-N-acetylmorphinan in 5 ml. anhydrous tetrahydrofuran (5 ml.), was added and the mixture was refluxed for 3 hours under nitrogen. The reaction mixture was cooled to room temperature and then 10 ml. ethyl acetate followed by 5 ml. water were added dropwise. The suspension was filtered and the filtrate was concentrated to give 662 mg. (87% yield) of crude (±)-3-methoxy-N-ethylmorphinan which on treatment with 48% hydrobromic acid afforded (±)-3-methoxy-N-ethylmorphinan hydrobromide. After several recrystallizations from ethanol-ether the compound melted at 238–240°.

EXAMPLE 10

Preparation of (±) - 1 - (p - methoxybenzyl) - 3,4,5,6,7,8 - hexahydro - 2(1H) - isoquinolinecarboxylic acid ethyl ester To a solution of 20 gm. (±)-1-(p-methoxyphenyl)-1,2,3,4,5,6,7,8-octahydroisoquinoline (20 g.) in 200 ml. dry pyridine, 75 ml. ethyl chloroformate was added dropwise over a period of one hour. The reaction mixture was stirred at room temperature overnight, then the solvent was removed under reduced pressure. The residue was dissolved in chloroform and the solution washed with 1 N hydrochloric acid, then with water, dried and evaporated to give 25.5 g. (99% yield) of crude (±)-1-(p-methoxybenzyl)-3,4,5,6,7,8-hexahydro - 2(1H) - isoquinoline carboxylic acid ethyl ester, B.P. 187–192°/0.075 mm.

EXAMPLE 11

Cyclization of (±)-1-(p-methoxybenzyl)-3,4,5,6,7,8-hexahydro-2(1H)-isoquinolinecarboxylic acid ethyl ester A mixture of 3.0 grams (±)-1-(p-methoxybenzyl)-3,4,5,6,7,8-hexahydro - 2(1H) - isoquinolinecarboxylic acid ethyl ester and 21 grams polyphosphoric acid was heated at 80° for 15 hours under nitrogen. The reaction mixture was diluted with 20 ml. water, made alkaline with conc. ammonium hydroxide and extracted with butanol-benzene (1:1 v./v.; 2× 30 ml.). The organic layers were washed with water, dried and evaporated to give 2.5 g. of crude residue. Gas chromatography analysis indicated that this material contained 24.2% of (±)-3-methoxy-N-ethoxycarbonylmorphinan.

EXAMPLE 12

Preparation of (±)-1-(p-methoxybenzyl)-3,4,5,6,7,8-hexahydro-2(1H)isoquinolinecarboxamide 1 ml. acetic acid and 13 grams urea (13 g.) were added to a solution of 5.6 grams (±)-1-(p-methoxybenzyl)-1,2,3,4,5,6,7,8-octahydroisoquinoline hydrochloride in 75 ml. water. The reaction mixture was refluxed for 1 hour, then cooled to room temperature. The product which separated as an oil was removed from the aqueous layer. The oily residue was washed with water (3× 25 ml.) and dissolved in ether. The ether solution was dried and evaporated to give 3.7 g. (65% yield) of crude (±)-1-(p-methoxybenzyl) - 3,4,5,6,7,8 - hexahydro - 2(1H) - isoquinolinecarboxamide which, after recrystallization from ether-pet. ether, melted at 96–98°.

EXAMPLE 13

Cyclization of (±)-1-(p-methoxybenzyl)-3,4,5,6,7,8-hexahydro-2(1H)-isoquinolinecarboxamide A mixture of 3.0 grams (±)-1-(p-methoxybenzyl)-3,4,5,6,7,8 - hexahydro - 2(1H)-isoquinolinecarboxamide and 21 grams polyphosphoric acid was stirred at 80° for 2 hours under nitrogen. The reaction mixture was cooled, decomposed with ice water, neutralized with conc. ammonium hydroxide and extracted with benzene-butanol (1:1). The organic solution was washed with water, dried and evaporated to give 2.92 g. of crude residue. This material was chromatographed on neutral alumina (55 g., Act. IV). The benzene eluates after evaporation to dryness and crystallization from acetone gave 158 mg. (5.3%) of (±)-3-methoxy-N-carbamoylmorphinan, M.P. 188–190°.

EXAMPLE 14

Preparation of (±)-1-(p-methoxybenzyl)-2-benzoyl-1,2,3,4,5,6,7,8-octahydroisoquinoline To a solution of 30 grams (±)-1-(p-methoxybenzyl)-1,2,3,4,5,6,7,8-octahydroisoquinoline in 600 ml. dry methylene chloride and 100 ml. triethylamine, 15 ml. benzoyl chloride in 200 ml. methylene chloride was added dropwise (25 minutes) and the resulting solution refluxed for 10 hours under nitrogen. The reaction mixture was cooled to room temperature and washed successively with 1 N hydrochloric acid (3× 200 ml.) 2% aqueous sodium carbonate, water and dried. Evaporation of the solvent and crystallization of the residue from heptane afforded 31.8 g. (76% yield) of (±)-1-(p-methoxybenzyl)-2-benzoyl-1,2,3,4,5,6,7,8-octahydroisoquinoline, M.P. 118–120°.

EXAMPLE 15

Cyclization of (±)-1-(p-methoxybenzyl)-2-benzoyl-1,2,3,4,5,6,7,8-octahydroisoquinoline 3 grams (±)-1-(p-methoxybenzyl)-2-benzoyl-1,2,3,4,5.6,7,8-octahydroisoquinoline and 21 grams polyphosphoric acid were stirred at 80° for 18 hours under nitrogen. The reaction mixture was hydrolyzed with ice water, neutralized with conc. ammonium hydroxide and extracted with butanol-benzene (1:1 v./v.). The organic solution was dried and the solvent was removed under reduced pressure to give 2.7 g. of crude product. VPC analysis of this material revealed the presence of 20% of (±)-3-methoxy-N-benzoylmorphinan.

EXAMPLE 16

Preparation of (±)-1-(p-methoxybenzyl)-2-formyldecahydro-4a-isoquinolinol (a) A suspension of 2 grams of (±)-1-(p-methoxybenzyl)-decahydro-4a-isoquinolinol [Henecka, Ann. 583, 110 (1953)] in 30 ml. of freshly distilled methyl formate was heated at 60–70° for 3 days in a sealed tube. The excess methyl formate was then removed under reduced pressure to give 1.66 g. of crude (±)-1-(p-methoxybenzyl) - 2 - formyldecahydro - 4a - isoquinolinol, M.P. 187–189°.

Conversion of (±) - 1 - (p - methoxybenzyl) - 2 - formyldecahydro - 4a - isoquinolinol to (±) - 3 - methoxy - N - formylmorphinan (b) 2 grams of (±)-1-(p-methoxybenzyl)-2-formyldecahydro-4a-isoquinolinol was added with stirring to 15 g. of phosphoric acid (99.3%) which had been mixed with 300 mg. of conc. sulfuric acid. This mixture was heated at 70° for 18 hours under nitrogen. The reaction mixture was cooled in an ice bath, diluted with ice water and neutralized with conc. ammonium hydroxide. The resulting aqueous suspension was extracted with a mixture of butanol-benzene (1:1, v./v.; 2× 100 ml.) and the combined organic layers were washed with water (2× 50 ml.), dried and filtered. Concentration of the filtrate gave 1.8 g. of crude residue. VPC analysis indicated that this material contained 88.3% of (±)-3-methoxy-N-formylmorphinan.

EXAMPLE 17

Conversion of (±) - 1 - (p - methoxybenzyl)-2-formyl-1,2,3,4,5,6,7,8 - octahydroisoquinoline to (±) - 3 - methoxy - N - formylmorphinan 2 grams of (±) - 1 - (p - methoxybenzyl) - 2 - formyl-1,2,3,4,5,6,7,8 - octahydroisoquinoline was added with stirring to 20 ml. of surfuric acid (80%) and the resulting mixture was stirred at room temperature for 10 minutes. The reaction mixture was cooled and poured into ice and the aqueous suspension was neutralized with conc. ammonium hydroxide, extracted with a mixture of butanol-benzene (1:1, v./v.; 2× 100 ml.). The combined organic layers were washed with water, dried and filtered. Concentration of the filtrate gave 1.79 g. of crude residue. VPC analysis indicated that this material contains 49.8% of (±) - 3 - methoxy - N - formylmorphinan.

What is claimed is:
1. A process for producing compounds represented by the formula

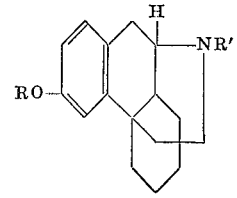

wherein R is hydrogen, lower alkyl, lower alkanoyl, benzoyl or naphthoyl and R' is

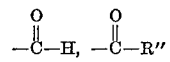

—CN, wherein R'' is lower alkyl, phenyl, naphthyl, substituted phenyl, substituted naphthyl, lower alkoxy, phenyloxy, naphyloxy, substituted phenyloxy, substituted naphthyloxy, —NHR''' or —N(R'''')$_2$; R''' is hydrogen, lower alkyl or phenyl, naphthyl, substituted phenyl or substituted naphthyl and R'''' is lower alkyl or phenyl, naphthyl, substituted phenyl or substituted naphthyl, where lower alkyl and lower alkoxy groups have straight or branched chains having from one to eight carbon atoms, lower alkanoyl groups have up to six carbon atoms, and substituted phenyl, naphthyl, phenyloxy and naphthyloxy means said groups substituted with lower linear alkyl or halogen, which comprises contacting compounds represented by the formulas

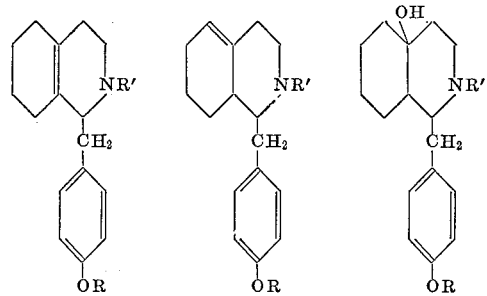

where R and R' are as above,
with an acid as the catalyst, selected from the group consisting of phosphoric acid, sulfuric acid, polyphosphoric acid or mixtures thereof, at a temperature of from about 0° C. to about 160° C. for up to about 24 hours, and isolating the resulting cyclization product.

2. A process for producing compounds represented by the formula

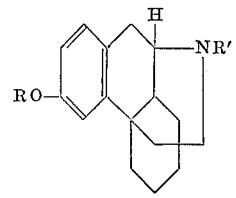

wherein R is hydrogen, lower alkyl, lower alkanoyl, benzoyl, naphthoyl and

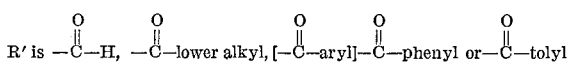

where lower alkyl groups have straight or branched chains having from one to eight carbon atoms and lower alkanoyl groups have up to six carbon atoms which comprises contacting compounds represented by the formulas

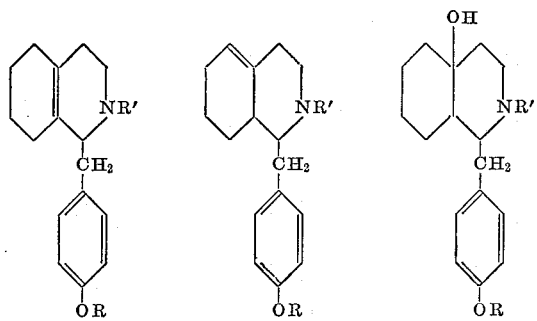

where R and R' are as above with an acid as the catalyst, selected from the group consisting of phosphoric acid, sulfuric acid, polyphosphoric acid or mixtures thereof at a temperature of from about 50° C. to about 100° C. for up to about 24 hours and isolating the resulting cyclization product.

3. A process for producing (±) - 3 - methoxy - N-formylmorphinan which comprises contacting (±) - 1 - (p - methoxybenzyl) - 2 - formyl - 1,2,3,4,5,6,7,8-octahydroisoquinoline with an acid cyclization catalyst selected from the group consisting of phosphoric acid, sulfuric acid, polyphosphoric acid or mixtures thereof at a temperature of from about 50° C. to about 100° C. for up to about 24 hours and isolating the resulting cyclization product.

4. The process of claim 3 wherein the acid catalyst is a mixture of phosphoric acid and sulfuric acid and the temperature of the reaction is about 70° C.

5. The process of claim 3 wherein the acid catalyst is phosphoric acid.

6. The process of claim 3 wherein the acid catalyst is polyphosphoric acid.

7. A process for producing (+) - 3 - methoxy - N-formylmorphinan which comprises contacting (+) - 1 - (p - methoxybenzyl) - 2 - formyl - 1,2,3,4,5,6,7,8 - octahydroisoquinoline with an acid catalyst selected from the group consisting of phosphoric acid, sulfuric acid, polyphosphoric acid or mixtures thereof at a temperature of from about 50° C. to about 100° C. for up to about 24 hours.

8. The process of claim 7 wherein the acid catalyst is a mixture of phosphoric acid and sulfuric acid.

9. The process of claim 7 wherein the acid catalyst is phosphoric acid.

10. Compounds represented by the formula

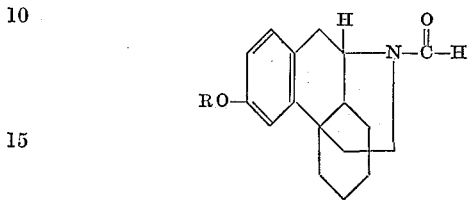

wherein R is hydrogen, lower alkyl, lower alkanoyl, benzoyl or naphthoyl where lower alkyl groups have straight or branched chains having from one to eight carbon atoms and lower alkanoyl groups have up to six carbon atoms.

11. A compound according to claim 10 wherein R is methyl.

12. The dextrorotatory compound according to claim 11.

13. The levorotatory compound according to claim 11.

14. The levorotatory compound according to claim 10 wherein R is hydrogen.

References Cited
UNITED STATES PATENTS

| | | | |
|---|---|---|---|
| 2,719,847 | 10/1955 | Grussner | 260—285 X |
| 3,201,403 | 8/1965 | Sawa | 260—285 |
| 3,438,989 | 4/1969 | Shavel et al. | 260—285 |

DONALD G. DAUS, Primary Examiner

U.S. Cl. X.R.

260—283 CN, 287 R, 289 R, 283 SA

UNITED STATES PATENT OFFICE
CERTIFICATE OF CORRECTION

Patent No. 3,634,429                      Dated January 11, 1972

Inventor(s)  Willy Leimgruber and Ernest Mohacsi

It is certified that error appears in the above-identified patent and that said Letters Patent are hereby corrected as shown below:

Column 2, line 33

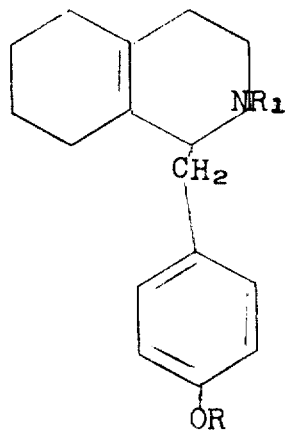   should be   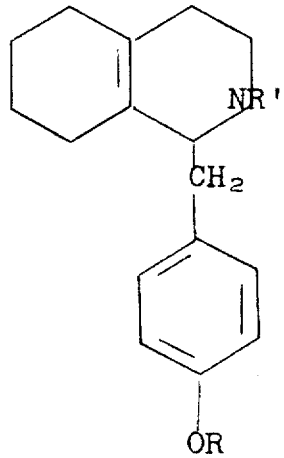

Column 7, line 10

Please delete   -2-formyl)

Column 8, line 6

"methoxyphenyl"   should be   methoxybenzyl

PO-1050
(5/69)

UNITED STATES PATENT OFFICE
CERTIFICATE OF CORRECTION

Patent No. 3,634,429            Dated _____

Inventor(s) _____

It is certified that error appears in the above-identified patent and that said Letters Patent are hereby corrected as shown below:

Column 10, line 71

Please delete [$-\overset{\overset{\text{O}}{\|}}{\text{C}}-\text{aryl}$]

Signed and sealed this 20th day of June 1972.

(SEAL)
Attest:

EDWARD M. FLETCHER, JR.        ROBERT GOTTSCHALK
Attesting Officer               Commissioner of Patents